(No Model.)
J. F. LESTER.
FIBER BRAKE, CRUSHER, AND CLEANER.
No. 518,259. Patented Apr. 17, 1894.
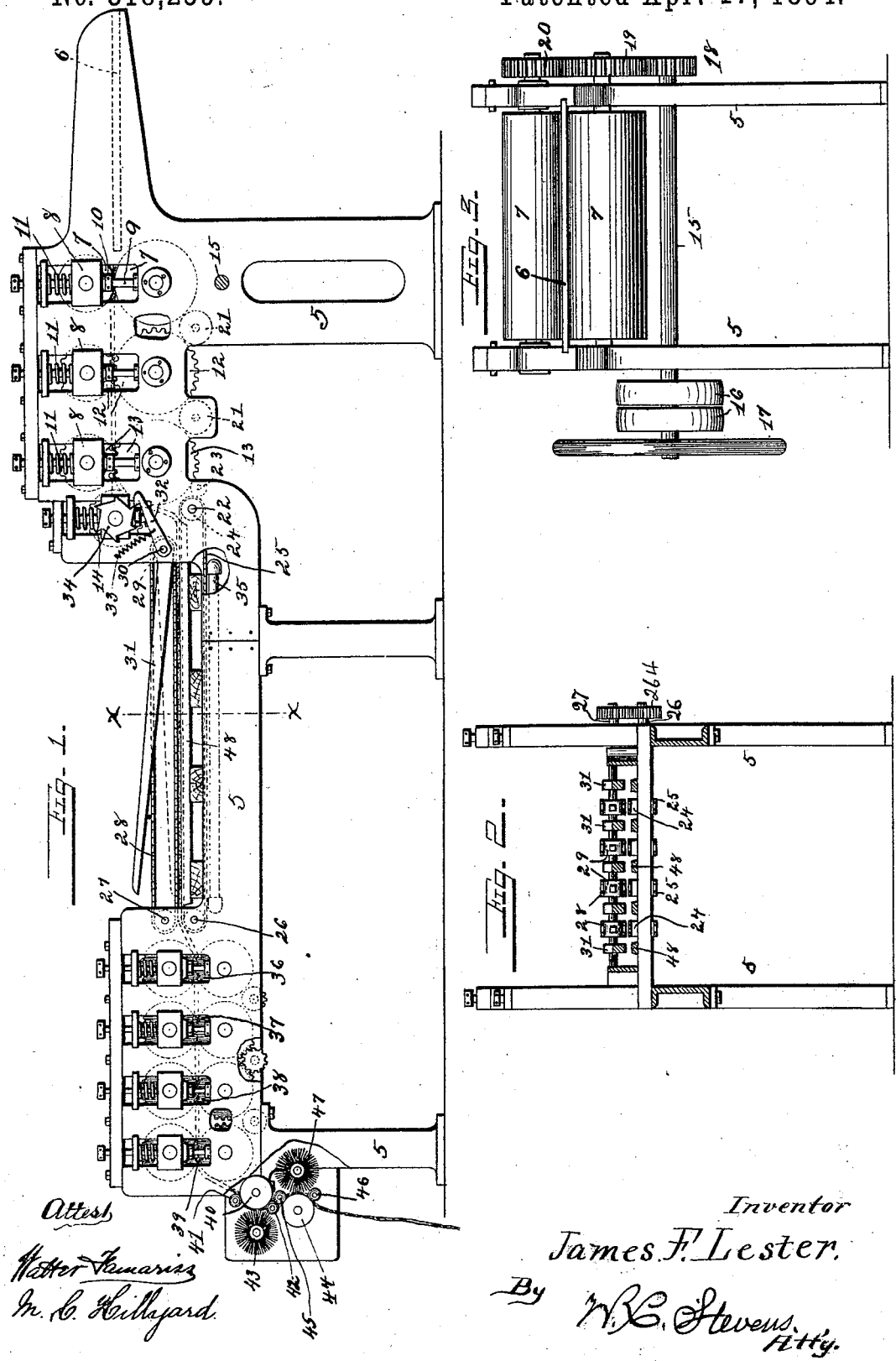
Inventor
James F. Lester.
By W. C. Stevens,
Atty.
Attest
Walter Tamarizz
M. C. Hillyard.

United States Patent Office.

JAMES FRANKLIN LESTER, OF ATLANTA, GEORGIA.

FIBER BRAKE, CRUSHER, AND CLEANER.

SPECIFICATION forming part of Letters Patent No. 518,259, dated April 17, 1894.

Application filed April 25, 1893. Serial No. 471,802. (No model.)

*To all whom it may concern:*

Be it known that I, JAMES FRANKLIN LESTER, a citizen of the United States, residing at Atlanta, in the county of Fulton and State of Georgia, have invented certain new and useful Improvements in Fiber Brakes, Crushers, and Cleaners; and I do hereby declare the following to be a full, clear, and exact description of the invention, such as will enable others skilled in the art to which it appertains to make and use the same.

This invention relates to that class of machines which are designed to separate the fiber from the stiff woody portion of grass and other fibrous growth, and its object is to provide means whereby the stalks and stems of the grass may be first crushed, then broken, then heated and whipped, then more finely broken and finally the fiber be brushed clean, all at one continuous process.

To this end my invention consists in the construction and combination of parts forming a fiber brake, crusher and cleaner, hereinafter described and claimed, reference being had to the accompanying drawings, in which—

Figure 1 is a side elevation partly in longitudinal vertical section with certain portions broken away, of a machine constructed according to my invention. Fig. 2 is a transverse vertical section at the line x of Fig. 1. Fig. 3 is a right hand end view of the machine.

5 represents the main frame of the machine upon which all the running gear is mounted.

6 is a table permanently fixed to the frame upon which dried grass is to be placed.

7 represents a pair of cylindrical smooth-faced rollers journaled in suitable bearings in the frame of the machine and geared to roll together. The bearings 8 of the upper roller are mounted to slide vertically in the frame, and are provided with adjusting screws 9 whereby the upper roller may be set to roll in contact with the lower roller or at any required distance therefrom.

10 is a check nut upon the screw 9 to hold it permanently fixed wherever it may be set.

11 is a spring located above each box 8 and between it and the frame. This spring is sufficiently stiff to hold the roller from being raised upward by the passage of grass alone but it yields to prevent breaking the machine by the accidental passage of a stick of wood or stone between the rollers.

12 and 13 are pairs of rollers mounted similarly to the rollers 7, but these rollers 12 and 13 are fluted and their flutes engage together like gear teeth so that the grass which has been crushed by passing through the roller 7 is now broken by passing between these rollers 12 and 13.

14 is another fluted roller toothing with the lower roller of the pair 13 to still further break the stalks and to direct the advancing mass downward.

15 is the driving shaft provided with belt pulleys 16, balance wheel 17 and a pinion gear wheel 18, the latter of which engages a gear wheel 19 upon the lower roller 7. The upper roller 7 is provided with a gear wheel 20 which is engaged by the wheel 19 to revolve therewith. Each of the pairs of rollers 12 and 13 is provided with similar gear wheels to the wheels 19 and 20 of the rollers 7, and the whole train of rollers is caused to revolve in one direction by means of intermediate gear wheels 21, the roller 14 being geared to the gear wheel of the lower roller of the pair 13.

22 is a shaft journaled in the frame and provided with a gear wheel communicating with the lower wheel 13 to be driven thereby through an intermediate wheel 23.

24 represents a series of sprocket wheels mounted upon the shaft 22 to carry chains 25.

26 is a shaft upon which another series of sprocket wheels is mounted for the same chains to run over.

27 is another shaft with sprocket wheels to carry chains 28 directly over chains 25 and geared to be revolved by and with a gear wheel 264 on the shaft 26.

29 represents a series of sprocket wheels mounted to revolve freely upon the shaft 30 which is journaled in the main frame. The sprocket wheels 29 carry the loop ends of the chains 28 opposite to the wheels 27.

31 represents a series of beaters rigidly fixed upon the shaft 30 between the chains 28.

32 is an arm rigidly fixed upon the end of the shaft 30 and connected with the frame by means of a spring 33.

34 is a cam mounted on the shaft of roller 14 and provided with teeth adapted to press against the arm 32 whereby the shaft 30 is alternately rocked backward and allowed to spring forward carrying the beaters 31 to strike sharp and rapid blows upon the fiber while it is being carried between the chains 25 and 28. The teeth of the cam are shaped to cause a very gradual rise to the beaters and the spring 33 gives a quick whipping stroke therewith.

35 represents a series of pipes located beneath the chains and through these pipes heated air, steam, or hot water may be passed to heat the fiber so that whatever portion of the stiff stalk still remains adhering thereto may be thoroughly dried at the instant of its being beaten and the refuse material be readily whipped off. I find this heating necessary because no matter how dry the grass seems to be when it enters the machine the act of crushing and breaking it seems to discover some slight juice or moisture which must be dried out, before the gum thereof will yield and permit the stiff refuse shell to be entirely driven away.

36, 37, 38 and 39 represent pairs of rollers fluted somewhat finer than the rollers 12 and 13. They are mounted in the frame and geared to run in pairs at about the same circumferential speed as the rollers 12 and 13.

40 represents a wooden roller against which two smaller rollers 41, 42 made of elastic or yielding material like rubber or cloth, are made to run at a circumferential speed a little greater than the speed of the foregoing rollers 39, &c., in order to draw upon the fibers and straighten them somewhat into line.

43 represents a cylindrical brush journaled in the frame to revolve rapidly in the same direction with the roller 40, and just touching to brush the same, for the purpose of brushing the fiber as it passes over the said roller.

44 is another wooden roller, and 45, 46 another pair of elastic or soft rollers rolling against it, and 47 is a brush journaled in the frame to revolve rapidly and brush the other side of the fiber so as to finish cleaning it.

In operation a quantity of dried grass with its stalks crossing in a general tangle being placed upon the table 6 and pushed forward, is gradually drawn in between the smooth-faced rollers 7 and partially crushed thereby, and matted together in the form of a web, which web passes forward, first between the rollers 12 by which it is crimpled and broken, and then between the rollers 13, and also between the rollers 13, 14 by which it is further crimpled and broken, and it is then delivered upon the apron or belt formed by the series of chains 25 and is carried forward between the chains 25, 28 over pipes 35 which heat and redry it. When it begins to be heated it is very lightly whipped by arms 31 striking it close to the shaft 30, and as it advances it is heated more and more while the blows of strikers 31 continue to increase in force until it reaches their ends where the greatest heat and the strongest blows are attained. Directly beneath each striker 31 is a longitudinal bar 48 (see Fig. 2) located a little below the carrying lever of the apron chain 25 so that when the beaters strike upon the web it is loose in the air to be flirted by the blows, but the web when driven below its plane by the blows is supported upon the bars 48. By this means the stiff matter which should now be reduced to dust, is gradually whipped out of the fiber, and yet the web of the fiber is supported so as not to be fractured by the beaters. If the beaters were reversed so as to point toward the forward end of the machine their blows would strike hardest on the grass when it is stiffest, that is when all the stiff woody matter still clings to the fiber, and the fiber itself would be broken, which is very undesirable because the length of fiber is one of its best qualities, but by the beaters striking rearward the woody matter is gradually driven off and the fiber is left whole. After passing the beaters the web of fiber is repeatedly crimpled between the finer fluted rollers 36 to 39, for the purpose of working the fiber tough and flexible. When it passes the rollers 39 the web or fiber is caught between the roller 40 and the yielding or cushion-like roller 41 which run a little faster than the preceding rollers for the purpose of gently straining upon and stretching the fiber, and between the rollers 41 and 42 the fiber is exposed to a rapid brushing by the rotary brush 43. A similar brushing is given to the opposite side of the fiber by the brush 47 between the rollers 45, 46. Of course there might be more pairs of such flexible rollers and cleaning brushes, more pairs of breaking rollers, more pairs of crushing rollers, and a different number of beaters without deviating from the spirit of my invention. The rollers 41, 42 are made elastic or soft in order that they may cling closer and with more certainty to the fiber which has by this time become reduced to a sleek silky consistence.

Having thus fully described my invention, what I believe to be new, and desire to secure by Letters Patent, is the following:

1. The combination in a fiber-brake, crusher and cleaner, of a receiving table; a pair of plain rollers; one or more pairs of fluted rollers; a series of carrier chains mounted to travel in line with the rollers; beaters journaled to strike vertically between the chains; a cam mounted on a revolving shaft and a spring connected with the beaters to operate them; heating pipes beneath the chains and beaters; one or more pairs of fluted rollers journaled in line to follow the chains and a cleaner comprising flexible rollers and brushes following the last-named fluted rollers, all mounted in a frame in the order named, substantially as described.

2. The combination in a fiber-brake, crusher and cleaner, of breaking rollers; chains arranged to travel in line of the rollers; a heater beneath the chains and beaters above the chains, substantially as described.

3. The combination in a fiber-brake, crusher and cleaner of rollers journaled in pairs in a frame; carrier chains mounted to rotate in line of the rollers; beaters mounted between the chains and a cam and spring for operating the beaters, substantially as described.

4. The combination in a fiber-brake, crusher and cleaner, of a series of carrier chains mounted to travel in a frame, means for breaking and delivering fibrous material between the chains, and beaters hung in the frame to strike vertically between the chains, substantially as described.

5. The combination in a fiber-brake, crusher and cleaner of beaters comprising arms pivoted above the plane of travel of the fiber to strike parallel with and in the direction of its line of travel whereby a stroke of gradually increasing force is applied to the fiber, and means for breaking and passing the fibrous material beneath the beaters, substantially as described.

6. The combination in a fiber-brake, crusher and cleaner, of beaters mounted on a frame, heating apparatus located beneath the beaters and means for breaking and passing fibrous material over the heating apparatus and beneath the beaters, substantially as described.

7. The combination in a fiber brake, crusher and cleaner, of a crusher; a breaker geared to the crusher and adapted to receive crushed fibrous material therefrom; a beater connected with the breaker and adapted to receive broken fibrous material therefrom; a heater beneath the beater, and a brusher belted to run in connection with the beater and adapted to receive the fibrous material therefrom, substantially as specified.

8. The combination in a fiber-brake, crusher and cleaner, of the carrier chains 25 and 28 mounted to travel one below the other, the bars 48 fixed between the chains 25, and a little below the plane thereof, and the beaters 31 adapted to strike upon the bars, substantially as described.

9. The combination in a fiber-brake, crusher and cleaner, of means for crushing and breaking vegetable fiber, means for beating it after breaking, and heating apparatus under the beater all arranged to operate mechanically in connection, substantially as described.

In testimony whereof I affix my signature in presence of two witnesses.

JAMES FRANKLIN LESTER.

Witnesses:
FRANK BOSWORTH,
F. M. SCOTT.